United States Patent
Harada et al.

(10) Patent No.: US 8,405,792 B2
(45) Date of Patent: Mar. 26, 2013

(54) PROTECTIVE PLATE INTEGRATED DISPLAY APPARATUS

(75) Inventors: Tatsuhito Harada, Hino (JP); Masaki Tsuji, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 390 days.

(21) Appl. No.: 12/721,611

(22) Filed: Mar. 11, 2010

(65) Prior Publication Data

US 2010/0231837 A1 Sep. 16, 2010

(30) Foreign Application Priority Data

Mar. 13, 2009 (JP) .................................. 2009-061950

(51) Int. Cl.
*G02F 1/1333* (2006.01)
(52) U.S. Cl. ........................................................ 349/58
(58) Field of Classification Search ...................... 349/58
See application file for complete search history.

(56) References Cited

U.S. PATENT DOCUMENTS

| | | | |
|---|---|---|---|
| 6,833,953 | B2 | 12/2004 | Miyazawa et al. |
| 7,830,595 | B2 | 11/2010 | Hinata et al. |
| 7,961,281 | B2 | 6/2011 | Tsuji et al. |
| 2006/0262260 | A1 | 11/2006 | Majumdar et al. |
| 2007/0070477 | A1 | 3/2007 | Eto et al. |
| 2007/0071909 | A1 | 3/2007 | Eun et al. |
| 2007/0097299 | A1 | 5/2007 | Watanabe et al. |
| 2007/0132911 | A1 | 6/2007 | Fujiwara et al. |
| 2007/0252922 | A1 | 11/2007 | Oohira |
| 2007/0267134 | A1 | 11/2007 | Konarski et al. |
| 2008/0106675 | A1 | 5/2008 | Uesaka et al. |
| 2008/0297685 | A1 | 12/2008 | Sugibayashi et al. |
| 2009/0011197 | A1 | 1/2009 | Matsuhira |
| 2009/0086123 | A1 | 4/2009 | Tsuji et al. |
| 2010/0149452 | A1 | 6/2010 | Harada et al. |
| 2010/0231821 | A1 | 9/2010 | Tsuji et al. |

(Continued)

FOREIGN PATENT DOCUMENTS

| JP | 3-204616 A | 9/1991 |
|---|---|---|
| JP | 6-337411 A | 12/1994 |

(Continued)

OTHER PUBLICATIONS

Japanese Office Action dated Aug. 23, 2011 (and English translation thereof) in counterpart Japanese Application No. 2009-061950.

(Continued)

*Primary Examiner* — Timothy L Rude
(74) *Attorney, Agent, or Firm* — Holtz, Holtz, Goodman & Chick, P.C.

(57) ABSTRACT

A protective plate integrated display apparatus includes a display panel, a protective plate to protect the observation side surface of the panel, a resin layer charged into a gap between the panel and plate to join them, and a plate-like support member having an opening corresponding to a screen area of the panel. The panel is disposed on one surface side of the support member so that the screen area faces the opening and a peripheral portion of the observation side surface is continuously fixed to the support member over the whole periphery through a frame-like adhesive layer continuously surrounding the whole periphery of the opening. The plate is arranged on the other surface side of the support member with its peripheral portion being fixed to the support member. The resin layer is charged into the opening of the support member and a region surrounded by the adhesive layer.

10 Claims, 10 Drawing Sheets

U.S. PATENT DOCUMENTS

| | | |
|---|---|---|
| 2010/0245707 A1 | 9/2010 | Harada |
| 2011/0070799 A1 | 3/2011 | Tsuji et al. |

FOREIGN PATENT DOCUMENTS

| | | |
|---|---|---|
| JP | 8-6503 A | 1/1996 |
| JP | 2529118 Y2 | 12/1996 |
| JP | 10-214032 A | 8/1998 |
| JP | 11-174417 A | 7/1999 |
| JP | 2000-075306 A | 3/2000 |
| JP | 2000-221512 A | 8/2000 |
| JP | 2002-347155 A | 12/2002 |
| JP | 2003-215344 A | 7/2003 |
| JP | 2005-55641 A | 3/2005 |
| JP | 2005-114789 A | 4/2005 |
| JP | 2005-179481 A | 7/2005 |
| JP | 2006-163742 A | 6/2006 |
| JP | 2006-189715 A | 7/2006 |
| JP | 2006-195209 A | 7/2006 |
| JP | 2007-114737 A | 5/2007 |
| JP | 2007-164154 A | 6/2007 |
| JP | 2008-170753 A | 7/2008 |
| JP | 2008-209510 A | 9/2008 |
| JP | 2008-241728 A | 10/2008 |
| JP | 2008-281997 A | 11/2008 |
| JP | 2009-8703 A | 1/2009 |
| JP | 2009-069333 A | 4/2009 |
| JP | 2009-075217 A | 4/2009 |
| JP | 2009-86187 A | 4/2009 |
| JP | 2009-086188 A | 4/2009 |
| JP | 2009-109855 A | 5/2009 |
| JP | 2009-175701 A | 8/2009 |
| KR | 100465678 B1 | 12/2004 |
| KR | 10-2008-0032116 A | 4/2008 |
| TW | M264519 U | 5/2005 |

OTHER PUBLICATIONS

U.S. Appl. No. 12/955,856 (which is a Continuation of *related* U.S. Appl. No. 12/236,696); First Named Inventor: Masaki Tsuji; Title: "Display Device Integral With Protection Plate and Display Apparatus Using the Same": Filed: Nov. 29, 2010.

Japanese Office Action dated Sep. 14, 2010 and English translation thereof issued in a counterpart Japanese Application No. 2007-254443 of *related* U.S. Appl. Nos. 12/236,696 and 12/955,856 (which is a Continuation of said U.S. Appl. No. 12/236,696).

U.S. Appl. No. 12/721,658, filed Mar. 11, 2010. Protective Plate Integrated Display Apparatus to Masaki Tsuji et al.

Japanese Office Action dated Aug. 18, 2009 and English translation thereof issued in counterpart Japanese Application No. 2007-254443.

Japanese Office Action dated Sep. 29, 2009 and English translation thereof issues in counterpart Japanese Application No. 2007-254442.

Chinese Office Action dated Mar. 12, 2010 and English translation thereof issued in counterpart Chinese Application No. 200810161751.6 of related U.S. Appl. No. 12/236,696.

Related U.S. Appl. No. 12/236,696, filed Sep. 24, 2008; M. Tsuji et al; Display Device Integral With Protection Plate, and Display.

Korean Office Action dated Mar. 26, 2010 and English translation thereof issued in Korean Application No. 10-2008-0093655, which is a counterpart of related U.S. Appl. No. 12/236,696.

Japanese Office Action dated Dec. 7, 2010 (and English translation thereof) in counterpart Japanese Application No. 2009-061950.

Non-final Office Action dated Aug. 26, 2010 issued in related U.S. Appl. No. 12/236,696.

Japanese Office Action dated Apr. 26, 2011 (and English translation thereof) in counterpart Japanese Application No. 2009-061950.

PROTECTIVE PLATE INTEGRATED DISPLAY APPARATUS

CROSS-REFERENCE TO RELATED APPLICATIONS

This application is based upon and claims the benefit of priority under 35 USC 119 of Japanese Patent Application No. 2009-061950 filed on Mar. 13, 2009, the entire disclosure of which, including the description, claims, drawings, and abstract, is incorporated herein by reference in its entirety.

BACKGROUND OF THE INVENTION

1. Field of the Invention

The present invention relates to a protective plate integrated display apparatus.

2. Description of the Related Art

In a protective plate integrated display apparatus, as described in, for example, Jpn. Pat. Appln. KOKAI Publication No. 11-174417, a display panel and a protective plate for protecting the observation side surface of the display panel are joined by a resin layer charged into a space between the display panel and the protective plate. However, in the conventional protective plate integrated display apparatus in which the display panel and the protective plate are simply joined by the resin layer, a problem occurs that the strength of the apparatus is not sufficient.

BRIEF SUMMARY OF THE INVENTION

A protective plate integrated display apparatus according to the present invention includes a display panel, a protective plate to protect the observation side surface of the display panel, a resin layer charged into a gap between the display panel and the protective plate to join the display panel and the protective plate, and a plate-like support member having an opening corresponding to a screen area of the display panel. The display panel is disposed on one surface side of the support member so that the screen area faces the opening and so that a peripheral portion of the observation side surface of the display panel is continuously fixed to the support member over the whole periphery thereof through a frame-like adhesive layer continuously provided between the support member and the display panel to surround the whole periphery of the opening. The protective plate is arranged on the other surface side of the support member with the peripheral portion of the protective plate being fixed to the support member. The resin layer is charged into the opening of the support member and a region surrounded by the adhesive layer between the display panel and the protective plate.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
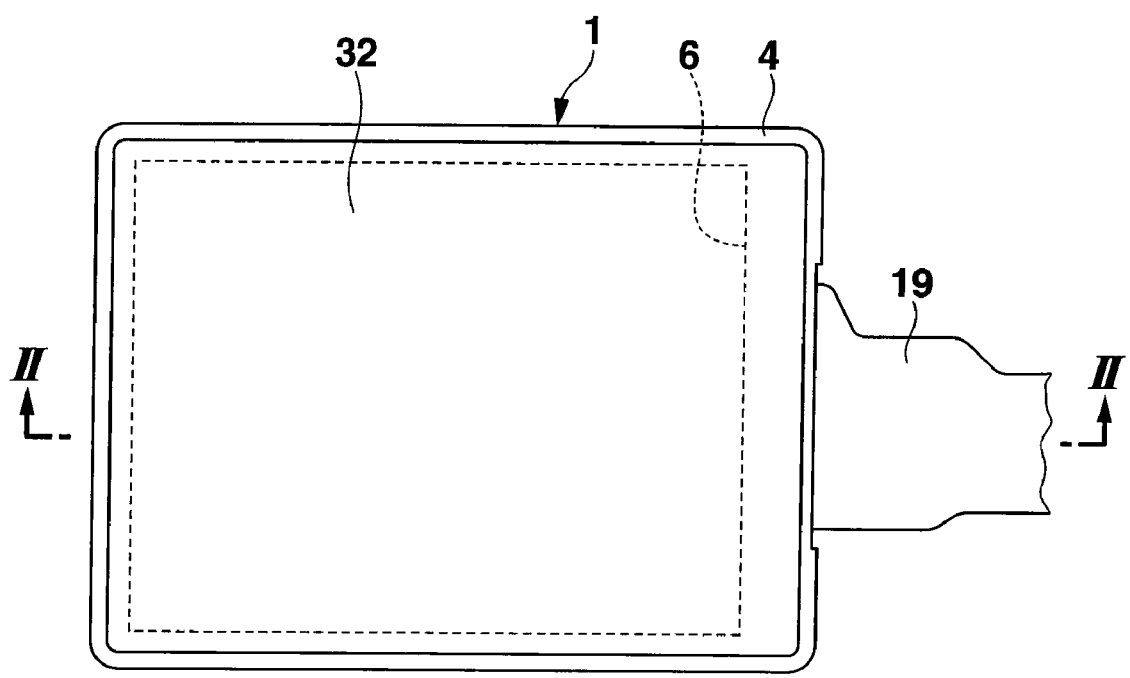
FIG. 1 is a plan view of a protective plate integrated display apparatus showing one embodiment of this invention.

Embodiments of the present invention will be explained with reference to the drawings.

A protective plate integrated display apparatus of this invention, which is to be mounted in an electronic apparatus such as a cellular phone or an electronic dictionary, includes a display panel storage case 1, a display panel 10 disposed in the case 1, and a protective plate 32 for protecting the observation side surface of the display panel 10, as shown in FIGS. 1 to 7.

The protective plate integrated display apparatus of this embodiment, which includes a liquid crystal display panel as the display panel 10, further includes a plane light source 20 disposed on a side opposite to the observation side of the liquid crystal display panel 10 to apply illuminative light to the liquid crystal display panel 10.

The liquid crystal display panel 10 is constituted by a pair of transparent substrates 12, 13 disposed on the observation side and the opposite side to face each other with a predetermined gap being therebetween and joined through a frame-like seal material 14 surrounding a screen area 11a; a liquid crystal layer 15 sealed in a region surrounded by the seal material 14 in the gap between the substrates 12 and 13; and polarizing plates 16, 17 as optical films attached to the outer surfaces of the pair of substrates 12, 13 on the observation side and the opposite side, respectively.

The liquid crystal display panel 10 is an active matrix liquid crystal display panel in which, for example, a thin film transistor (TFT) is used as an active device. Although not shown in the drawing, on the inner surface of the substrate 13 on the opposite side, there are provided a plurality of transparent pixel electrodes arranged in a matrix-like manner in row and column directions; a plurality of TFTs arranged corresponding to these pixel electrodes and connected to the corresponding pixel electrodes, respectively; a plurality of scanning lines to supply gate signals to the TFTs of the respective rows; a plurality of signal lines to supply data signals to the TFTs of the respective columns; and a first alignment film formed to cover these components. On the inner surface of the observation side substrate 12, there are provided color filters of three colors of red, green and blue formed corresponding to the pixel electrodes, respectively; single-film-like transparent opposed electrodes formed on these color filters to face the arrangement regions of the pixel electrodes; and a second alignment film formed to cover the opposed electrodes.

Moreover, the opposite substrate 13 includes, along one side thereof, a driver mounting portion 13a outwardly projecting from the observation side substrate 12, and on the driver mounting portion 13a, a driver device 18 is mounted which successively applies the gate signals to the respective scanning lines and which applies the data signals to the respective signal lines. This driver mounting portion is connected to a wiring line film 19 for connecting the driver device 18 to a driver control circuit (not shown).

It is to be noted that the liquid crystal display panel 10 may be of a TN type in which liquid crystal molecules are substantially twisted/aligned at a twisted angle of 90°; an STN type in which the liquid crystal molecules are twisted/aligned at a twisted angle of 180° to 270°; a vertical alignment type in which the liquid crystal molecules are substantially aligned vertically to a substrate surface; a non-twisted horizontal alignment type in which the molecule long axes of the liquid crystal molecules are aligned in one direction and the molecules are substantially aligned in parallel with the substrate surface; or a bend alignment type in which the liquid crystal molecules are bent/aligned, or may be a ferroelectric or anti-ferroelectric liquid crystal display device.

Furthermore, the liquid crystal display panel 10 is not limited to a panel in which the pair of substrates 12, 13 are provided with electrodes for forming a plurality of pixels, respectively, and may be a lateral electric field control type liquid crystal display panel in which a first electrode for forming a plurality of pixels is provided on the inner surface of the opposite substrate 13, and a second electrode insulated from the first electrode and including a plurality of elongated electrode portions is provided on a liquid crystal layer side or an opposite substrate 13 side from the first electrode, whereby a lateral electric field (the electric field having a direction along the substrate surface) is generated between these electrodes to change the alignment state of the liquid crystal molecules.

Moreover, the plane light source 20 is constituted of a light guide plate 21 which is made of a plate-like transparent member and which includes an entrance end face 22 formed on one end face thereof so that light enters the face, an exit face 23 formed on one of two plate surfaces to emit the light which has entered the entrance end face 22, and a reflective face 24 formed on the other plate surface to internally reflect, toward the exit face 23, the light which has entered the entrance end face 22; a plurality of light emitting elements 25 such as light emitting diodes (LED) disposed to face the entrance end face 22 of the light guide plate 21; a diffusion layer 26 provided on the exit face 23 of the light guide plate 21 to diffuse the light emitted from the light guide plate 21; and two prism sheets 27, 28 laminated on the diffusion layer 26.

Figure 2:
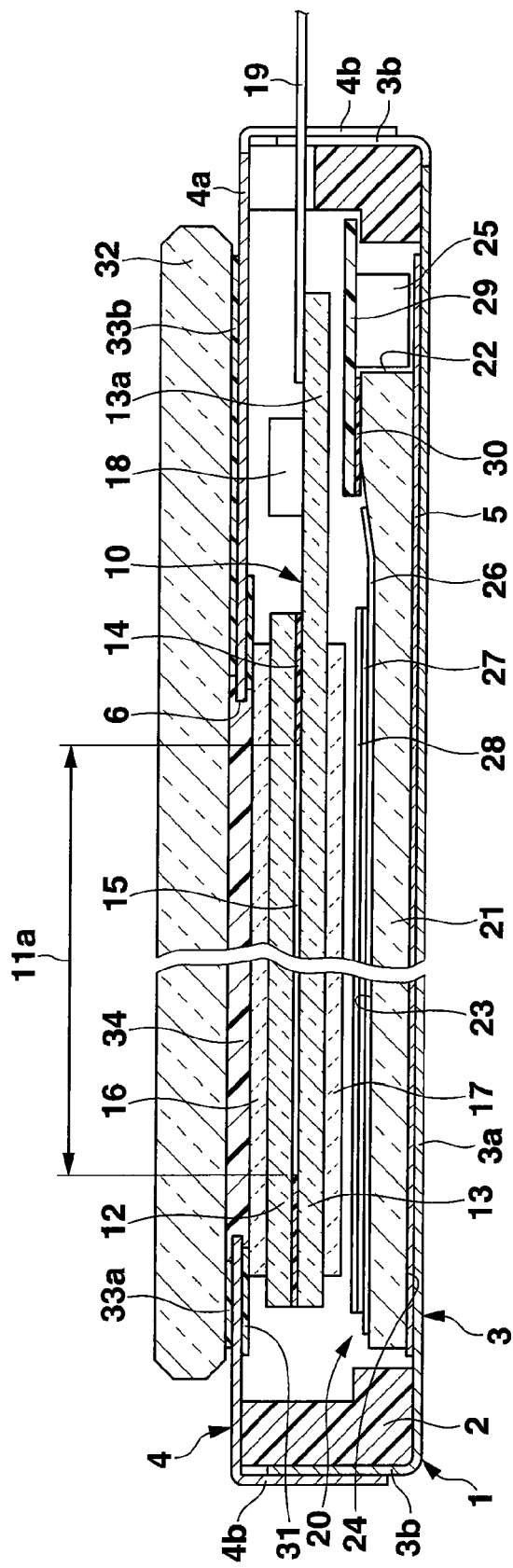
FIG. 2 is a sectional view in which the center of the protective plate integrated display apparatus is omitted.

It is to be noted that in FIG. 2, each of the prism sheets 27, 28 is shown like a single film. However, on one of the prism sheets 27, 28, for example, on the prism sheet 27 on a diffusion layer 26 side, a plurality of elongated prisms are formed at close pitches along the width direction of the light guide plate 21 (the direction parallel to the entrance end face 22 and the exit face 23). On the other prism sheet 28, a plurality of elongated prisms are formed at close pitches along the longitudinal direction of the light guide plate 21 (the direction perpendicular to the width direction of the light guide plate 21 and parallel to the exit face 23).

Moreover, the light emitting elements 25 are provided on a light source circuit substrate 29 in which a lighting circuit for the light emitting elements 25 is formed, and the side edge of the circuit substrate 29 is attached to the end of the exit face 23 of the light guide plate 21 on an entrance end face 22 side by an adhesive double coated tape 30, whereby the circuit substrate is arranged to face the entrance end face 22 of the light guide plate 21.

The plane light source 20 emits, from the whole region of the exit face 23 of the light guide plate 21, the light which has exited from the light emitting elements 25 and has entered the light guide plate 21 through the entrance end face 22, diffuses the light by the diffusion layer 26, and refracts the light by the two prism sheets 27, 28 in such a direction that the angle of the exit face 23 of the light guide plate 21 with respect to a normal line direction decreases, to emit the illuminative light having an intensity distribution with a high exit light intensity in the normal line direction, that is, a front surface direction.

On the other hand, the case 1 is constituted of a rectangular-frame-like resin frame 2 including a space which is larger than the outer shape of the liquid crystal display panel 10 and the plane light source 20; a lower case 3 made of a metal plate and including a bottom plate 3a having a shape corresponding to the outer shape of the frame 2 and a side plate 3b bent upwardly from the peripheral of the bottom plate 3a; and an upper case 4 made of a metal plate and including an upper surface plate 4a having a shape corresponding to the outer shape of the lower case 3 and a side plate 4b bent downwardly from the peripheral of the upper surface plate 4a.

The case 1 is assembled by bringing the bottom plate 3a of the lower case 3 into contact with the lower surface of the frame 2 to fit the lower case 3 into the resin frame 2 and by bringing the upper surface plate 4a of the upper case 4 into contact with the upper surface of the frame 2 and covering the side plate 3b by the side plate 4b of the upper case 4 to engage the upper case 4 with the frame.

It is to be noted that although not shown in the drawing, the outer peripheral surface of the frame 2 is provided with a plurality of projections, and the side plates 3b, 4b of the lower case 3 and the upper case 4 are provided with a plurality of engagement holes corresponding to the projections, respectively, whereby the projections are fitted into the engagement holes of the lower case 3 and the upper case 4, respectively, to engage the cases with the frame 2.

Moreover, the plane light source 20 is disposed on the bottom plate 3a of the lower case 3 fitted into the frame 2 so that the plane light source opposite to the exit side of the illuminative light, that is, the reflective face 24 of the light guide plate 21 faces the bottom plate 3a.

It is to be noted that on the bottom plate 3a of the lower case 3, a reflective film 5 is formed which reflects the light leaking from the reflective face 24 of the light guide plate 21 of the plane light source 20 so that the light enters the light guide plate 21 again. When the plane light source 20 is disposed, the reflective face 24 of the light guide plate 21 comes in contact with the reflective film 5.

Furthermore, the upper case 4 also serves as a support member to support the liquid crystal display panel 10 and the protective plate 32. On the upper surface plate 4a of the upper case 4, a rectangular opening 6 corresponding to the screen area 11a of the liquid crystal display panel 10 is provided, and the liquid crystal display panel 10 is disposed so that the screen area 11a of the panel faces the opening 6 of the upper case 4 and so that the peripheral portion of the polarizing plate 16 provided on the observation side surface of the liquid crystal display panel 10 is fixed to the inner surface of the upper case 4 by an adhesive layer 31 provided between the inner surface of the upper case 4 and the liquid crystal display panel 10 to surround the opening 6.

It is to be noted that the opening 6 of the upper case 4 is formed corresponding to a region of the light guide plate 21 of the plane light source 20 except the end of the light guide plate on the entrance end face 22 side, and the liquid crystal display panel 10 is disposed so that the screen area 11a of the panel faces the opening 6 and so that the driver mounting portion 13a corresponds to the arrangement side of the light emitting elements 25 of the plane light source 20.

Figure 4:
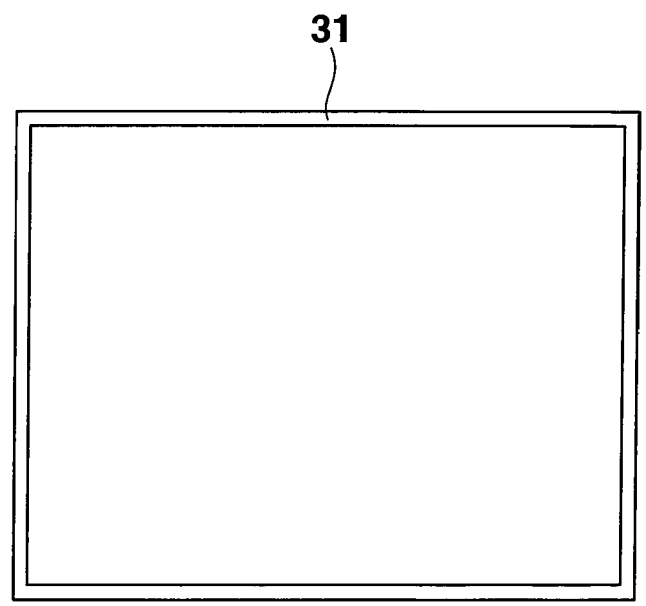
FIG. 4 is a plan view of an adhesive layer provided between a support member and a display panel in the protective plate integrated display apparatus.

As shown in FIG. 4, the adhesive layer 31 is made of an adhesive double coated film formed into a frame-like shape which continuously surrounds the whole periphery of the opening 6, and the liquid crystal display panel 10 is continuously disposed over the whole periphery of the peripheral portion of the film and fixed to the inner surface of the upper case 4 by the adhesive layer 31.

Figure 5:
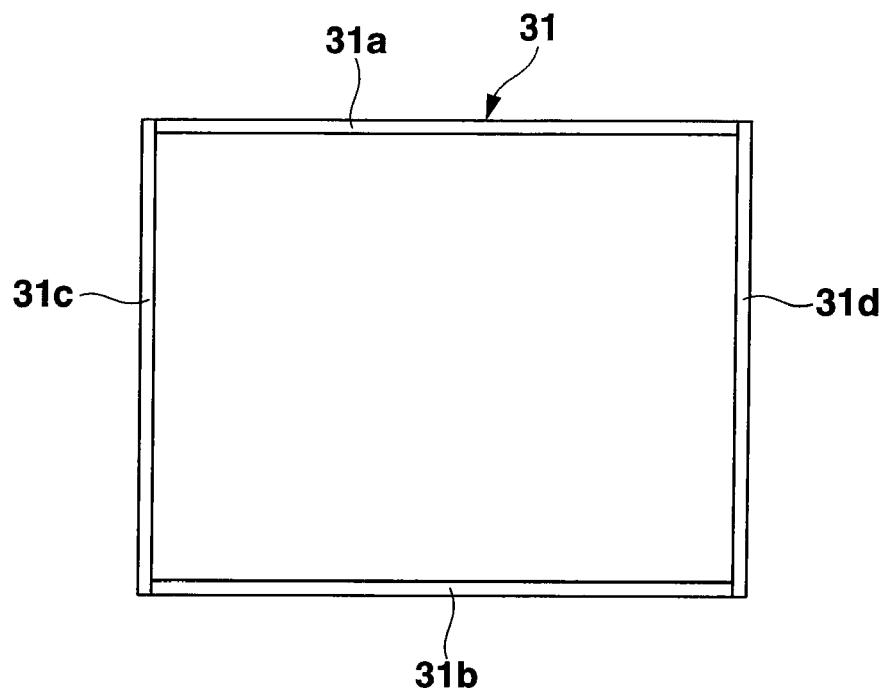
FIG. 5 is a plan view showing a modification of the adhesive layer.

It is to be noted that in the adhesive layer 31, as in a modification shown in FIG. 5, the ends of a plurality of adhesive double coated films 31a, 31b, 31c and 31d formed into a rectangular shape may be held on one another to arrange the films in a frame-like shape, whereby the plurality of adhesive double coated films 31a, 31b, 31c and 31d are continuously connected to one another.

Moreover, the protective plate 32 is a transparent plate such as a glass plate or an acrylic resin plate, and is disposed so that the peripheral portion of the protective plate is overlapped on the upper surface plate 4a of the upper case 4. Specifically, the opening 6 has a rectangular shape with four sides as edges, the protective plate 32 has a rectangular shape with four edges disposed along the respective sides of the opening 6, and the protective plate 32 is overlapped on the upper surface plate 4a of the upper case 4 in four regions corresponding to spaces between the respective sides of the opening 6 and the respective edges of the protective plate 32 disposed along the sides of the opening, respectively.

Furthermore, at least one region of the four regions, that is, the region overlapped on the driver mounting portion 13a of the liquid crystal display panel 10 in this embodiment, is formed into a shape having a larger length (the projecting width of the protective plate 32) along a direction perpendicular to the side of the opening 6 disposed along the region among the respective sides of the opening 6 (the projecting direction of the protective plate 32) as compared with the other regions of the four regions.

On the other hand, the upper surface plate 4a of the upper case 4 is overlapped on the peripheral portion of the polarizing plate 16 or the observation side substrate 12 of the liquid crystal display panel 10. Specifically, the polarizing plate 16 or the observation side substrate 12 of the liquid crystal display panel 10 has a rectangular shape with four edges disposed along the sides of the opening 6, and the upper surface plate 4a of the upper case 4 is overlapped on the polarizing plate 16 or the observation side substrate 12 of the liquid crystal display panel 10 in four regions corresponding to spaces between the respective sides of the opening 6 and the edges of the polarizing plate 16 or the observation side substrate 12 of the liquid crystal display panel 10 disposed along the sides of the opening, respectively. Here, the direction perpendicular to the sides of the opening 6 disposed along the regions is referred to the projecting direction of the liquid crystal display panel 10, and the length of the liquid crystal display panel 10 along the projecting direction is referred to the projecting width of the liquid crystal display panel 10.

As described above, the peripheral portion of the protective plate 32 projects to overlap the periphery of the opening 6 of the upper case 4, and the projecting width of at least one edge of the peripheral portion is larger than that of each of the other edges. Outside the case 1, that is, on the upper case 4, the protective plate is fixed to the outer surface of the upper case 4 through a plurality of spacers 33a, 33b provided between the outer surface of the upper case 4 and the protective plate 32 to surround the opening 6 at intervals.

In this embodiment, in the peripheral portion of the protective plate 32 projecting to the periphery of the opening 6 of the upper case 4, the projecting width of the edge overlapped on the driver mounting portion 13a of the liquid crystal display panel 10 is larger than that of each of the other edges.

Figure 6:
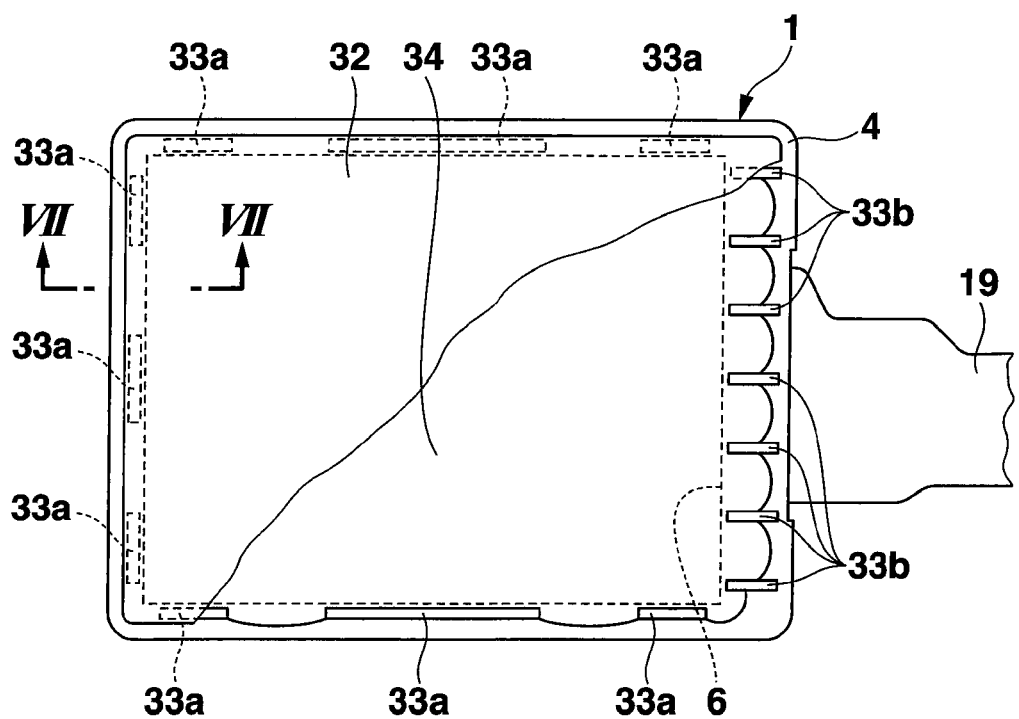
FIG. 6 is a plan view showing the charged state of a resin layer in the protective plate integrated display apparatus.

Moreover, as shown in FIG. 6, among the plurality of spacers 33a, 33b, each of the spacers 33a disposed along the edge of the protective plate 32 having a small projecting width is formed into an elongated rectangular shape having a long axis along a direction parallel to the edges of the opening 6, and each of the spacers 33b disposed along the edge of the protective plate 32 having a large projecting width is formed into an elongated rectangular shape having a long axis along a direction parallel to the projecting direction of the protective plate 32, and formed continuously extending from the edge of the opening 6 to the edge of the protective plate 32.

Each of the plurality of spacers 33a, 33b is made of an adhesive double coated film, and each of the spacers 33a arranged along the edge of the protective plate 32 having the small projecting width is arranged at the edge of the opening 6. The length of the spacer along the direction parallel to the edge of the opening 6 is larger than that along the projecting direction of the protective plate 32. Each of the spacers 33b arranged along the edge of the protective plate 32 having the large projecting width has a shape in which the length thereof along the projecting direction of the protective plate 32 is larger than that along the direction parallel to the edge of the opening 6. Moreover, in this embodiment, the spacers 33b are arranged in parallel with one another so that the side of each of the spacers 33b along the projecting direction of the protective plate 32 is substantially perpendicular to the edge of the opening 6 at which the spacers 33b are arranged among the edges of the opening 6. Furthermore, the sides of the spacers 33b along the projecting direction of the protective plate 32 are parallel to one another, and the spacers are disposed at predetermined intervals.

Moreover, the protective plate 32 is fixed to the outer surface of the upper case 4 by the plurality of spacers 33a, 33b each made of the adhesive double coated film, and the protective plate is disposed so that air release portions for releasing air to the outside from the region surrounded by the plurality of spacers 33a, 33b are formed between the adjacent spacers 33a and 33a, 33b and 33b and 33a and 33b, respectively, in the space between the outer surface of the upper case 4 and the protective plate 32.

Furthermore, a transparent resin layer 34 is charged into the opening 6 of the upper case 4 and a region surrounded by the plurality of spacers 33a, 33b between the liquid crystal display panel 10 and the protective plate 32, and the charged resin layer 34 is hardened to join the liquid crystal display panel 10 and the protective plate 32.

The resin layer 34 is formed as follows. That is, first, before fixing the protective plate 32 and the liquid crystal display panel 10 to each other, a resin having heat hardening properties and/or light hardening properties is supplied onto the liquid crystal display panel 10 fixed to the inner surface of the upper case 4. In this case, the resin may be supplied onto the surface of the protective plate 32 fixed to the inner surface of the upper case 4 and facing the liquid crystal display panel 10.

Next, the protective plate 32 is overlapped on the upper case 4 and pressurized to fix the protective plate 32 to the outer surface of the upper case 4 by the plurality of spacers 33a, 33b. Simultaneously, the supplied resin is spread and charged into the opening 6 of the upper case 4 between the liquid crystal display panel 10 and the protective plate 32 and the whole region surrounded by the adhesive layer 31 and the plurality of spacers 33a, 33b. Moreover, in this state, the resin is hardened to form the resin layer 34.

Figure 7:
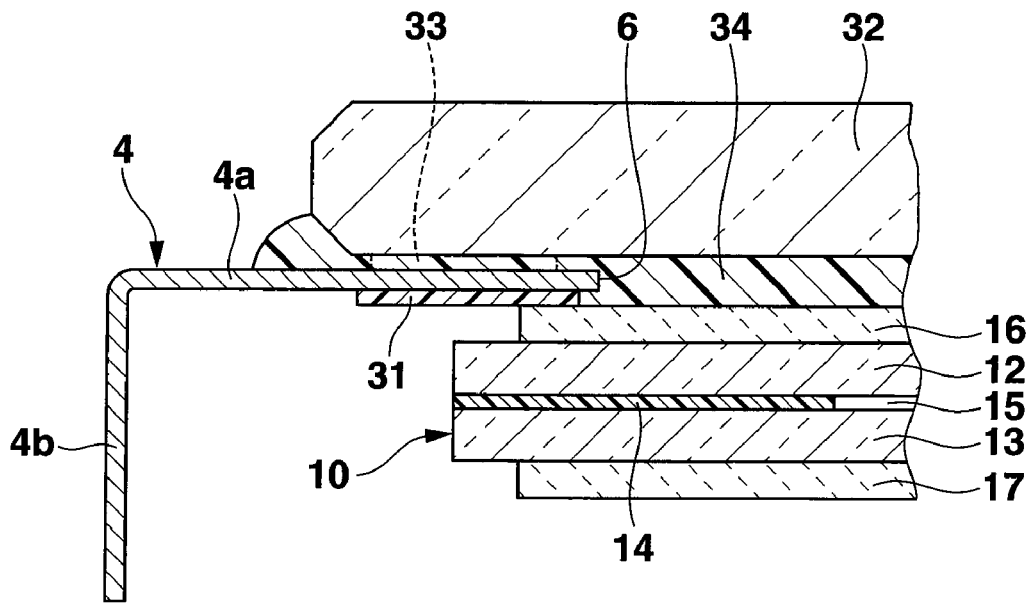
FIG. 7 is an enlarged sectional view cut along the VII-VII line of FIG. 6.

When the resin layer 34 is formed, the supplied resin is spread while releasing the air in the space between the liquid crystal display panel 10 and the protective plate 32 from the air release portions between the adjacent spacers 33a and 33a, 33b and 33b, and 33a and 33b, whereby the excessive resin is projected and charged from the air release portions as shown in FIGS. 6 and 7.

Moreover, the case 1 is assembled by mounting the upper case 4 to which the liquid crystal display panel 10 and the protective plate 32 have been attached on the frame 2 and the lower case 3 in which the plane light source 20 is received. It is to be noted that the side surface of the case 1 is provided with a drawing port of the wiring line film 19 connected to the driver mounting portion 13a of the liquid crystal display panel 10, and the wiring line film 19 and a lead wire (not shown) for connecting the light source circuit substrate 29 to an external circuit are extracted from the case 1 through the drawing port.

The peripheral portion of the protective plate integrated display apparatus is overlapped on the upper surface plate 4a of the upper case 4. That is, in the protective plate integrated display apparatus, the upper case 4 as a part of the display panel storage case 1 is used as a support member to support the liquid crystal display panel 10 and the protective plate 32, the liquid crystal display panel 10 is disposed on the side of the inner surface of the upper case 4 so that the screen area 11a faces the opening 6 provided in the upper case 4, and the peripheral portion of the observation side surface of the panel is fixed to the upper case 4, the panel is also disposed on the side of the outer surface of the upper case 4 so that the protective plate 32 is fixed to the upper case 4 through the plurality of spacers 33a, 33b provided between the upper case 4 and the protective plate 32 to surround the opening 6 at intervals, and the resin layer 34 is charged into the opening 6 of the upper case 4 between the liquid crystal display panel 10 and the protective plate 32 and the region surrounded by the plurality of spacers 33a, 33b, to join the liquid crystal display panel 10 and the protective plate 32 by the resin layer 34, whereby the liquid crystal display panel 10 and the protective plate 32 can be strengthened from the peripheries thereof by the upper case 4. Therefore, strength against bend or the like is sufficiently acquired.

Additionally, in this protective plate integrated display apparatus, the liquid crystal display panel 10 is fixed to the inner surface of the upper case 4 by the adhesive layer 31 which is formed into a frame-like shape shown in FIG. 4 or 5 to continuously surround the whole periphery of the opening 6 of the upper case 4. The protective plate 32 is fixed to the outer surface of the upper case 4 by the plurality of spacers 33a, 33b which are provided to surround the opening 6 at intervals, whereby the air release portions are formed between the spacers 33a and 33b. Therefore, when the resin layer 34 is charged between the liquid crystal display panel 10 and the protective plate 32, any excessive resin does not project toward the liquid crystal display panel 10.

Figure 8:
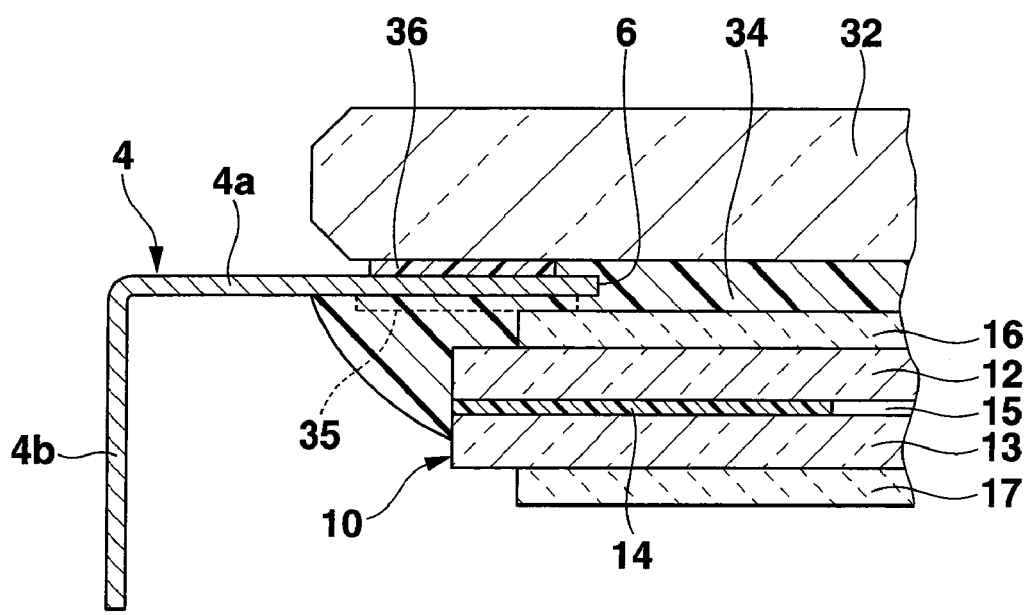
FIG. 8 is a sectional view of a part corresponding to FIG. 7 and showing a first comparative example.

That is, as shown in FIG. 8, in a first comparative example, the liquid crystal display panel 10 is fixed to the inner surface of the upper case 4 by a plurality of adhesive layers 35 which are provided to surround the opening 6 of the upper case 4 at intervals, thereby forming air release portions among the adhesive layers 35, and the protective plate 32 is fixed to the outer surface of the upper case 4 by a spacer 36 which is formed into a frame-like shape to continuously surround the whole periphery of the opening 6. In the comparative example, when the resin layer 34 is charged between the liquid crystal display panel 10 and the protective plate 32, an excessive resin projects to the periphery of the liquid crystal display panel 10. When the amount of the projecting resin is large, the projecting resin hits against the frame 2, or the projecting resin turns to the surface of the liquid crystal display panel 10 opposite to the observation side thereof to hit against the plane light source 20, whereby the case 1 cannot be assembled, or the arrangement of the other electronic components in the vicinity of the liquid crystal display panel 10 is adversely affected sometimes.

On the other hand, in the protective plate integrated display apparatus of the above embodiment, the excessive resin does not project toward the liquid crystal display panel 10, whereby the case 1 can be assembled without any trouble, and the electronic components and the like can be disposed in the vicinity of the liquid crystal display panel 10 without any trouble.

Figure 3:
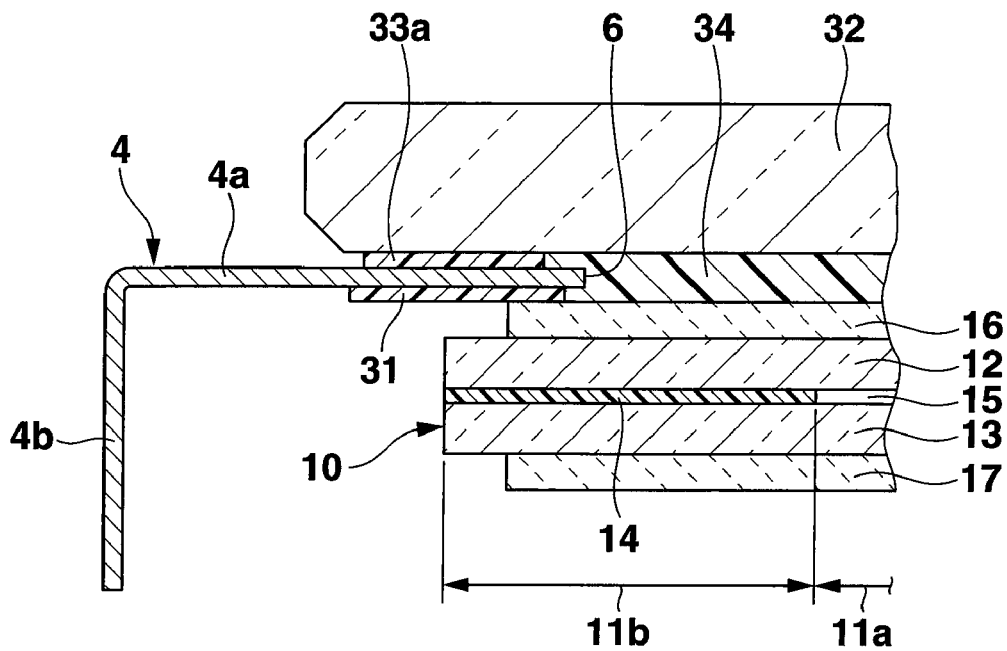
FIG. 3 is an enlarged view of a part of FIG. 2.

Moreover, as shown in FIG. 3, the protective plate integrated display apparatus of the above embodiment is disposed so that the peripheral portion of the polarizing plate 16 provided on the observation side surface of the panel is fixed to the inner surface of the upper case 4 by the adhesive layer 31, whereby the width of a portion 11b around the screen area 11a of the liquid crystal display panel 10 can be decreased.

Figure 9:
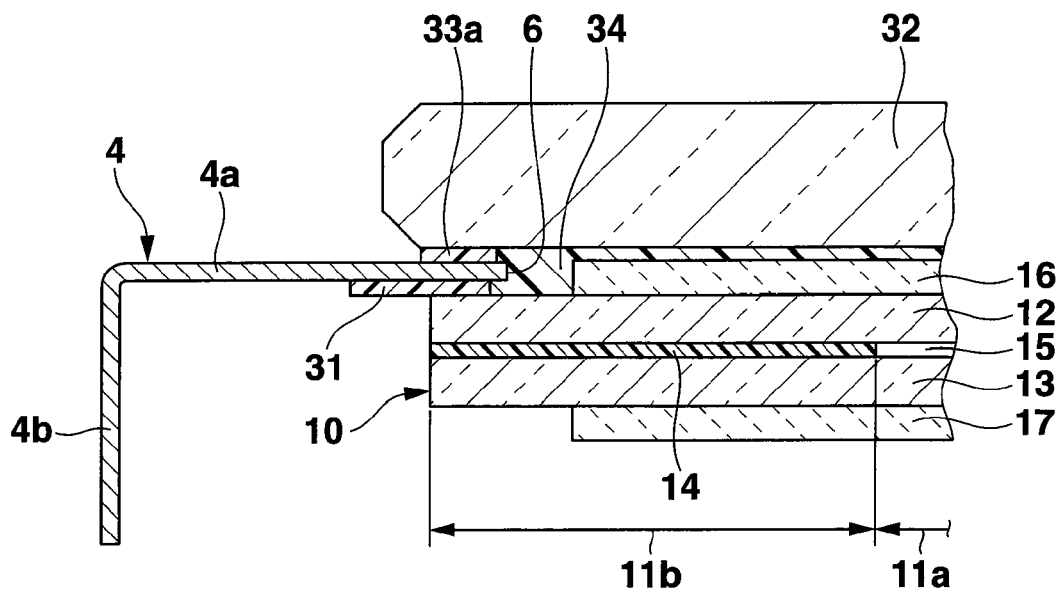
FIG. 9 is a sectional view of a part corresponding to FIG. 3 and showing a second comparative example.

That is, as shown in FIG. 9, in a second comparative example, the liquid crystal display panel 10 is disposed so that an outer portion of the panel from the polarizing plate 16 provided on the observation side surface thereof, that is, the peripheral portion of the observation side substrate 12 is fixed to the inner surface of the upper case 4 by the adhesive layer 31. In the comparative example, the liquid crystal display panel 10 is fixed to the upper case 4 with a sufficient strength, whereby the peripheral portion of the observation side substrate 12 has to be noticeably projected in the periphery of the polarizing plate 16 to secure the overlapping width of the adhesive layer 31. To this end, the width of the portion 11b around the screen area 11a of the liquid crystal display panel 10 needs to be increased, and the outer shape of the liquid crystal display panel 10 noticeably enlarges as compared with the size of the screen area 11a.

On the other hand, in the protective plate integrated display apparatus of the above embodiment, the peripheral portion of the polarizing plate 16 provided on the observation side surface of the liquid crystal display panel 10 is fixed to the inner surface of the upper case 4 by the adhesive layer 31. Therefore, unlike the second comparative example, the peripheral portion of the observation side substrate 12 does not have to be noticeably projected in the periphery of the polarizing plate 16. In consequence, the width of the portion 11b around the screen area 11a of the liquid crystal display panel 10 can be decreased, whereby the outer shape of the liquid crystal display panel 10 can be made small, and consequently the display apparatus can be miniaturized.

It is to be noted that when the miniaturization of the display apparatus is not required, as in the second comparative example, the peripheral portion of the observation side substrate 12 of the liquid crystal display panel 10 may be fixed to the inner surface of the upper case 4 by the adhesive layer 31.

Furthermore, in the protective plate integrated display apparatus of the above embodiment, among the plurality of spacers 33a, 33b provided between the upper case 4 and the protective plate 32, each of the spacers 33b disposed along the edge of the protective plate 32 having the large projecting width from the opening 6 are formed continuously extending from the edge of the opening 6 to the edge of the protective plate 32, whereby air can be prevented from being accumulated in the resin layer 34 charged between the liquid crystal display panel 10 and the protective plate 32.

That is, the peripheral portion of the protective plate 32 projects to the periphery of the opening 6 of the upper case 4, and at least one edge (the edge overlapped on the driver mounting portion 13a of the liquid crystal display panel 10 in the above embodiment) of the peripheral portion has the projecting width which is larger than that of each of the other edges. Therefore, the protective plate faces the upper case 4 with a width as the length of a region where the edge of the protective plate 32 having the large projecting width faces the upper case 4 along the projecting direction, and the length is larger than that of a region where the other edges thereof face the upper case 4 along the projecting direction.

Figure 10:
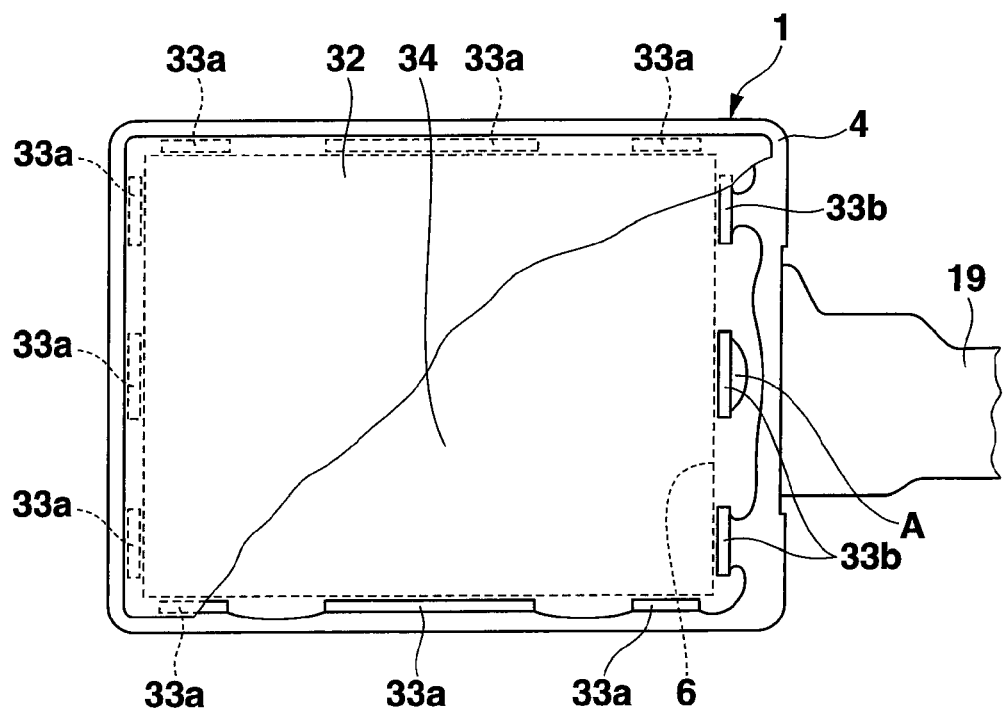
FIG. 10 is a plan view showing the charged state of a resin layer in a third comparative example.

In consequence, as shown in FIG. 10, in a third comparative example, each of the spacers 33b disposed along the edge of the protective plate 32 having a large projecting width from the opening 6 is disposed along the edge of the opening 6 so as to be formed into a shape whose length along the projecting direction is smaller than the length along the direction parallel to the edge of the opening 6, in the same manner as in the spacers 33a disposed along the other edges of the protective plate. In this example, a resin projecting from each air release portion between the spacers 33b and 33b disposed along the edge of the protective plate 32 having the large projecting width spreads to the periphery of a space between the protective plate 32 and the upper case 4, and the resins projecting from the adjacent air release portions are connected to each other, thereby sometimes confining and accumulating air A between the projecting resin connecting portion and the spacer 33b.

Therefore, in the protective plate integrated display apparatus of this third comparative example, in a high-temperature environment, the compressed air A might expand and enter a region corresponding to the screen area 11a, for example, a region on the screen area 11a of the liquid crystal display panel 10 to impair a display quality.

On the other hand, in the protective plate integrated display apparatus of the above embodiment, as shown in FIG. 6, the spacers 33b disposed along the edge of the protective plate 32 having the large projecting width from the opening 6 are formed continuously extending from the edge of the opening 6 to the edge of the protective plate 32. Therefore, unlike the first comparative example, the resin projecting from each air release portion between the spacers 33b and 33b disposed along the edge of the protective plate 32 having the large projecting width is not connected to another resin or does not generate the accumulated air in the resin layer 34.

In this way, since any air is not accumulated in the resin layer 34 of the protective plate integrated display apparatus of the above embodiment, a satisfactory display quality can be maintained.

Figure 11:
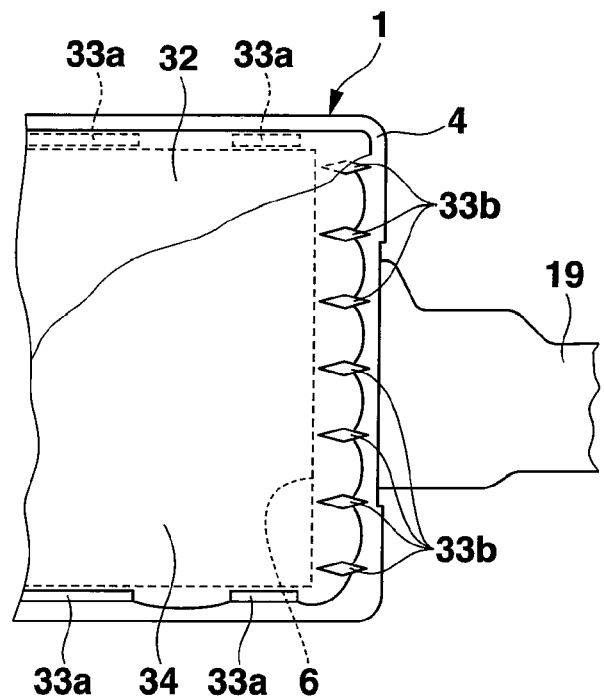
FIG. 11 is a plan view showing a modification of spacers provided between the support member and the protective plate in the protective plate integrated display apparatus.
Figure 12:
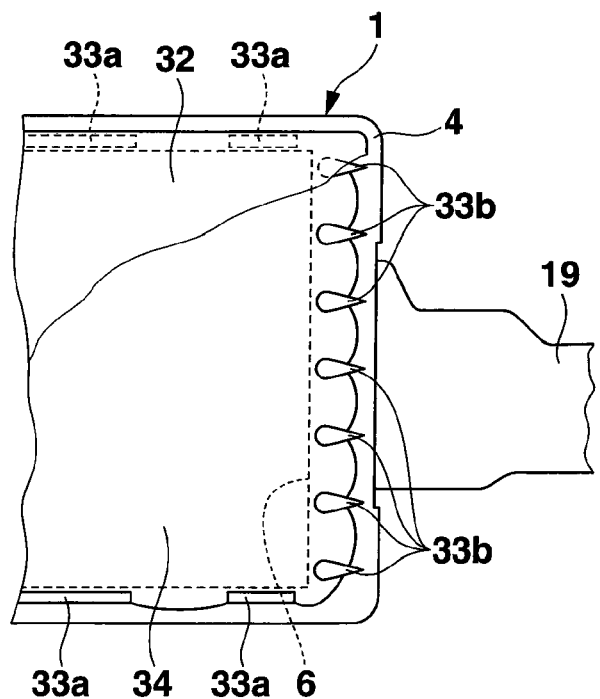
FIG. 12 is a plan view showing another modification of the spacers.
Figure 13:
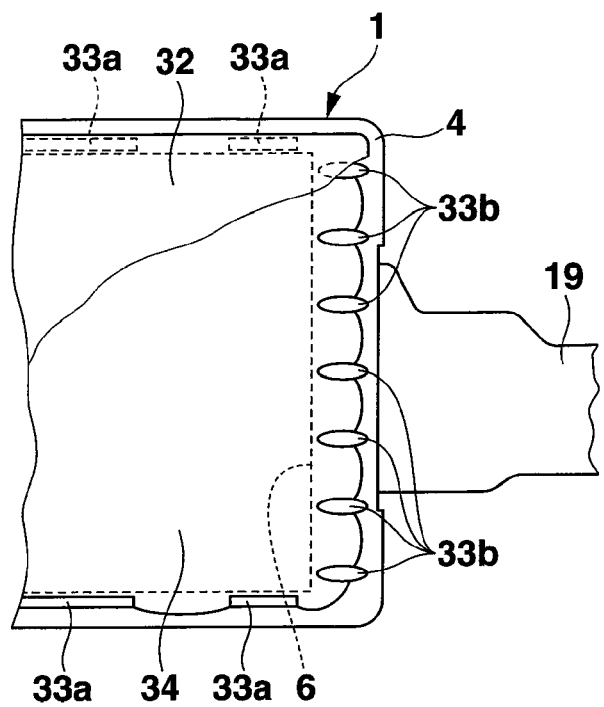
FIG. 13 is a plan view showing still another modification of the spacers.

It is to be noted that in the above embodiment, the spacers 33b disposed along the edge of the protective plate 32 having the large projecting width from the opening 6 are formed into an elongated rectangular shape having a long axis parallel to the projecting direction of the protective plate 32, but the shape is not limited to the elongated rectangular shape as long as the spacers 33b have an elongated shape continuously extending from the edge of the opening 6 to the edge of the protective plate 32 and having the long axis parallel to the projecting direction of the protective plate 32, and the spacers 33b may be formed into an arbitrary shape such as a rhombic shape shown in FIG. 11, a wing-like sectional shape shown in FIG. 12, or an elliptic shape shown in FIG. 13.

Figure 14:
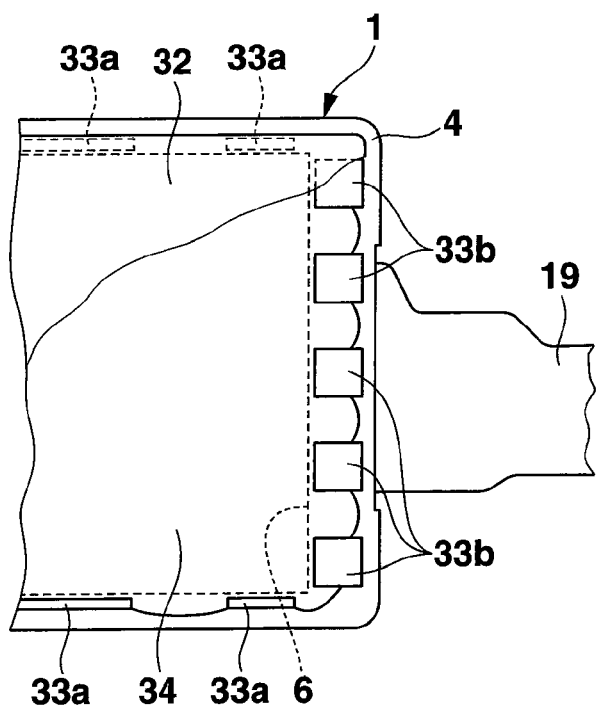
FIG. 14 is a plan view showing a further modification of the spacers.
Figure 15:
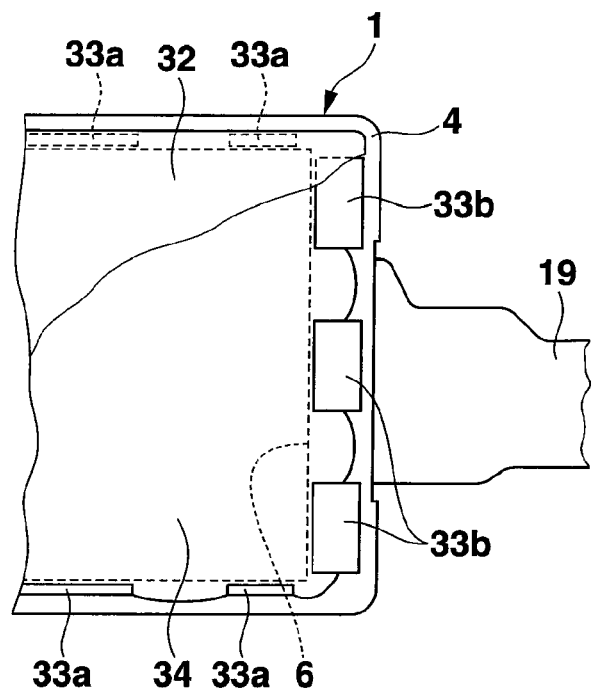
FIG. 15 is a plan view showing a further modification of the spacers.
Figure 16:
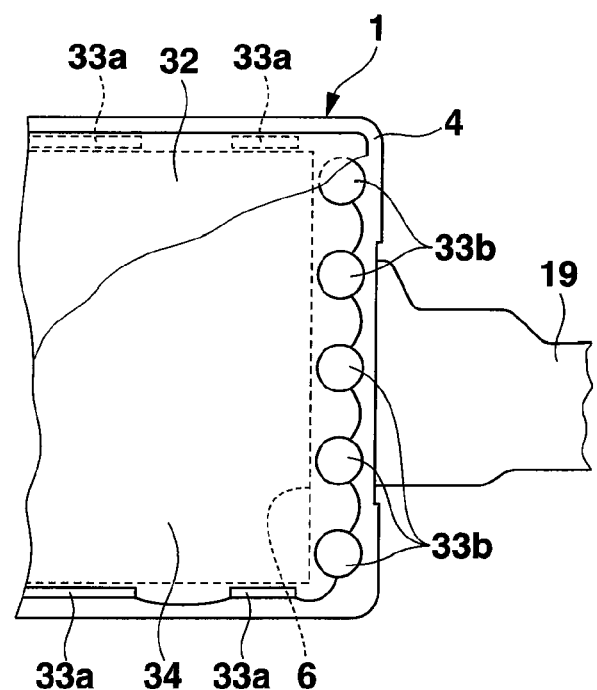
FIG. 16 is a plan view showing a further modification of the spacers.
Figure 17:
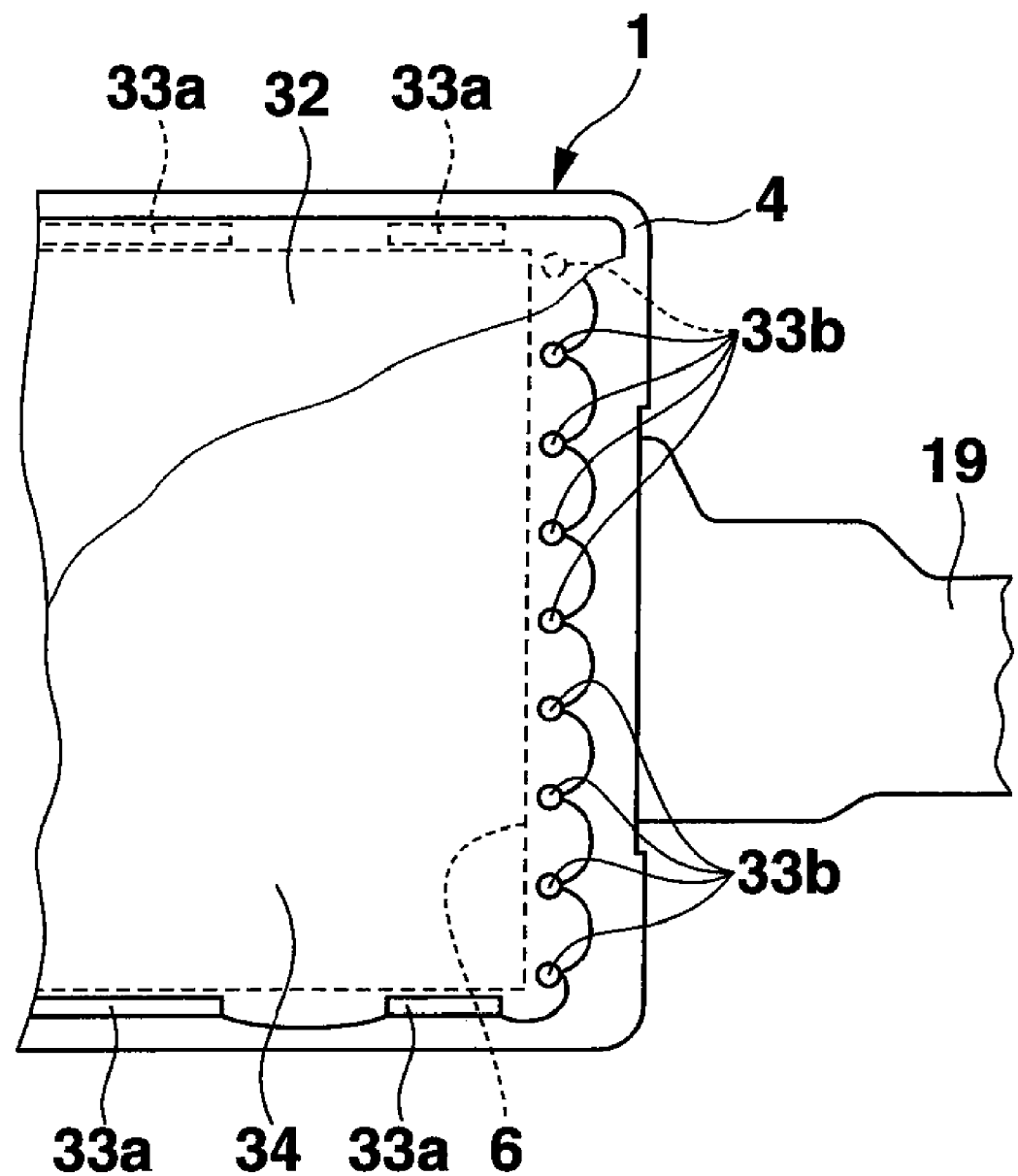
FIG. 17 is a plan view showing a still further modification of the spacers.

Moreover, the shape of the spacers 33b is not limited to the elongated shape as long as the spacers do not generate any accumulated air in the resin layer 34, and the spacers 33b may be formed into a square shape shown in FIG. 14, a rectangular shape having a long axis parallel to the edge as shown in FIG. 15, a round shape shown in FIG. 16, a dotted shape which continuously does not extend from the edge of the opening 6 to the edge of the protective plate 32 as shown in FIG. 17, or the like.

Furthermore, the shape of the protective plate 32 is not limited to the shape having the edge with the large projecting width from the opening 6 of the upper case 4 as described in the above embodiment, and all the edges of the protective plate may have a small projecting width from the opening 6. In this case, the length of each of the spacers 33a, 33b along a direction parallel to the edge of the opening 6 may be larger than the length thereof along the projecting direction of the protective plate 32, and the spacers may be provided along the edges of the opening 6.

It is to be noted that the protective plate integrated display apparatus of the above embodiment includes the liquid crystal display panel 10 provided with the polarizing plates 16, 17 on the observation side surface and the opposite surface thereof, respectively, but on the observation side surface of the liquid crystal display panel 10, there may be laminated a plurality of optical films including a retardation plate and the like for improving contrast, viewing angle and the like and the polarizing plate 16.

Furthermore, the protective plate integrated display apparatus of the above embodiment includes the liquid crystal display panel 10 as the display panel, but the display panel is not limited to the liquid crystal display panel, and may be a light emitting display panel such as an electroluminescence (LE) display panel including plates overlapped on the observation side surface thereof, for example, a ¼ wavelength retardation plate (a λ/4 plate) for preventing the surface reflection of external light and a polarizing plate. In this case, the plane light source 20 of the above embodiment is not necessary.

Moreover, the protective plate integrated display apparatus of the above embodiment includes the display panel storage case 1, and the upper case 4 as one of the constituent members of the case 1 supports the display panel and the protective plate 32, but the support member to support the display panel and the protective plate 32 may be another plate-like member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protective plate integrated display apparatus comprising:
    a display panel;
    a protective plate which protects an observation side surface of the display panel;
    a resin layer charged into a gap between the display panel and the protective plate to join the display panel and the protective plate; and
    a plate-like support member having an opening corresponding to a screen area of the display panel;
    wherein the display panel is disposed on a first surface side of the support member so that the screen area faces the opening and so that a peripheral portion of the observation side surface of the display panel is continuously fixed to the support member over a whole periphery thereof through a frame-like adhesive layer continuously provided between the support member and the display panel to surround a whole periphery of the opening;
    wherein the protective plate is arranged on a second surface side of the support member with a peripheral portion of the protective plate being fixed to the support member;
    wherein the resin layer is charged into the opening of the support member and a region surrounded by the adhesive layer between the display panel and the protective plate;
    wherein the protective plate is fixed to the support member through a plurality of spacers provided between the support member and the protective plate to surround the opening at intervals;
    wherein the protective plate is shaped to have projecting widths so that the peripheral portion of the protective plate is overlapped on the periphery of the opening of the support member, and at least one of the plurality of spacers is continuously formed extending from an edge of the opening to an edge of the protective plate;
    wherein the peripheral portion of the protective plate has a plurality of edges overlapped on the periphery of the opening of the support member, a projecting width of at least one edge of the plurality of edges is larger than a projecting width of each of the other edges of the plurality of edges, and at least one spacer arranged along the edge of the protective plate having the large projecting width among the plurality of spacers is continuously formed extending from the edge of the opening to the edge of the protective plate.

2. The protective plate integrated display apparatus according to claim 1, wherein:
    the plurality of spacers include a plurality of air accumulation preventing spacers arranged along the edge having the large projecting width,
    the air accumulation preventing spacers are continuously formed extending from the edge of the opening to the edge of the protective plate and have an elongated shape in which a long axis extends in a direction perpendicular to the edge of the protective plate, and
    the air accumulation preventing spacers are arranged at predetermined intervals so that the long axes of the spacers are parallel to one another.

3. The protective plate integrated display apparatus according to claim 1, wherein:
    the display panel has a rectangular shape having four edges and includes, along one edge among the four edges thereof, an outwardly projecting driver mounting portion,
    the protective plate has a rectangular shape having four edges, the projecting widths of the protective plate are sized such that the four edges of the protective plate are overlapped on the periphery of the opening of the support member, respectively, and the edge of the protective plate overlapped on the driver mounting portion among the four edges thereof has the projecting width which is larger than that of each of the other edges.

4. The protective plate integrated display apparatus according to claim 1, wherein the spacers have one of an elongated rectangular shape, a rhombic shape, an elliptic shape, a square shape, a rectangular shape having a long axis parallel to a corresponding edge of the protective plate, and a round shape.

5. The protective plate integrated display apparatus according to claim 1, wherein the spacers have a dotted shape.

6. The protective plate integrated display apparatus according to claim 1, wherein the adhesive layer comprises an adhesive double coated film.

7. The protective plate integrated display apparatus according to claim 1, wherein the display panel is disposed so that a peripheral portion of an optical film provided on the observation side surface is fixed to the support member.

8. The protective plate integrated display apparatus according to claim 7, wherein the optical film comprises a polarizing plate.

9. The protective plate integrated display apparatus according to claim 1, wherein the support member comprises display panel storage case, the display panel is arranged in the case so that the peripheral portion of the observation side surface of the display panel is fixed to an inner surface of the support member, and the protective plate is arranged outside the case so as to be fixed to an outer surface of the support member.

10. The protective plate integrated display apparatus according to claim 1, wherein the display panel comprises a liquid crystal display panel, and on a side of the liquid crystal display panel opposite to the observation side thereof, a plane light source to apply illuminative light to the liquid crystal display panel is arranged.

* * * * *